United States Patent
D'Agostini et al.

(10) Patent No.: US 12,085,282 B2
(45) Date of Patent: Sep. 10, 2024

(54) HYDROGEN INJECTION FOR ENHANCED COMBUSTION STABILITY IN GAS TURBINE SYSTEMS

(71) Applicant: Air Products and Chemicals, Inc., Allentown, PA (US)

(72) Inventors: Mark Daniel D'Agostini, Allentown, PA (US); Anup Vasant Sane, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 2 days.

(21) Appl. No.: 18/229,319

(22) Filed: Aug. 2, 2023

(65) Prior Publication Data

US 2024/0019123 A1 Jan. 18, 2024

Related U.S. Application Data

(62) Division of application No. 17/678,134, filed on Feb. 23, 2022, now Pat. No. 11,808,457.

(51) Int. Cl.
| | |
|---|---|
| *F23R 3/28* | (2006.01) |
| *F23R 3/14* | (2006.01) |
| *F23R 3/36* | (2006.01) |
| *F02C 3/20* | (2006.01) |

(52) U.S. Cl.
CPC ............... *F23R 3/286* (2013.01); *F23R 3/14* (2013.01); *F23R 3/36* (2013.01); *F02C 3/20* (2013.01)

(58) Field of Classification Search
CPC .. F23R 3/28; F23R 3/283; F23R 3/286; F23R 3/14; F23R 3/36; F02C 3/20
See application file for complete search history.

(56) References Cited

U.S. PATENT DOCUMENTS

| | | |
|---|---|---|
| 7,578,130 B1 | 8/2009 | Kraemer |
| 2009/0113895 A1 | 5/2009 | Steele |
| 2010/0255435 A1 | 10/2010 | Sigh |
| 2013/0019584 A1 | 1/2013 | Koizumi et al. |
| 2013/0219903 A1 | 8/2013 | Kiozumi |
| 2017/0198905 A1 | 7/2017 | D'Agostini et al. |
| 2017/0299190 A1 | 10/2017 | Patel |

(Continued)

FOREIGN PATENT DOCUMENTS

| | | |
|---|---|---|
| EP | 0918093 | 5/1999 |
| EP | 2902708 | 8/2015 |
| WO | 2019/222334 | 11/2019 |

*Primary Examiner* — William H Rodriguez
(74) *Attorney, Agent, or Firm* — Robert A. Diaz

(57) ABSTRACT

A hydrogen injection scheme can be employed via use of one or more injectors for injecting hydrogen to help entrain local mass while also generating local turbulence that can enhance mixing with a mixture of air and fuel to facilitate enhanced lean combustion, lower peak flame temperatures of combustion, and reduce nitrous oxide ($NO_x$) emissions from the combustion of fuel. In some embodiments, the hydrogen can be injected to help transport heat released during combustion away from the injector to help avoid injector overheating as well. Different injectors can be utilized to provide a desired hydrogen injection scheme for a particular set of design and operational criteria for a gas turbine system or at least one combustion system that can be utilized in a gas turbine system.

20 Claims, 9 Drawing Sheets

(56) References Cited

U.S. PATENT DOCUMENTS

| | | |
|---|---|---|
| 2019/0078777 A1 | 3/2019 | Keller et al. |
| 2020/0072466 A1 | 3/2020 | Akiyama |
| 2022/0268213 A1 | 8/2022 | Morenko |
| 2022/0290863 A1* | 9/2022 | Naik ......................... F23R 3/12 |
| 2023/0065831 A1* | 3/2023 | Oskam .................... F02C 7/222 |

* cited by examiner

HYDROGEN INJECTION FOR ENHANCED COMBUSTION STABILITY IN GAS TURBINE SYSTEMS

CROSS-REFERENCE TO RELATED APPLICATIONS

This application claims priority to U.S. Provisional Patent Application No. 63/153,620, filed on Feb. 25, 2021 and U.S. application Ser. No. 17/678,134 filed on Feb. 23, 2022.

FIELD

The present innovation relates to gas turbines, injection devices for combustion chambers in a gas turbine system, operation of gas turbines, operation of injectors for combustion used in conjunction with a gas turbine system, plants utilizing one or more gas turbine systems, and methods of making and using the same.

BACKGROUND

A gas turbine arrangement commonly used for industrial power generation is illustrated in FIG. 1. As can be appreciated from International Publication No. WO 2019/222334, this arrangement can conventionally include a cold section characterized by a compressor, followed by a hot section that has a combustor section and a turbine. The cold section often includes an air intake for feeding air to a multi-stage axial flow compressor that delivers high pressure air to the combustor section. A fuel can be mixed with the air flow and combusted in the combustion section to produce a high temperature, high pressure gas stream that is to be fed to the turbine. The turbine is downstream of the combustor section and is configured to receive the hot combustion gas from the combustor section and expand that flow of gas as the gas passes through the turbine, which spins the rotating blades of the turbine. Often, the rotating blades of the turbine are attached to a shaft to rotate the shaft to perform a dual function: (1) help drive the compressor to draw more pressurized air into the combustor section, and (2) spin a generator to produce electricity. The operating pressure ratio of the turbine, which is defined as the pressure of the air at the compressor exit to that of the air at the compressor intake, is normally less than about 18:1.

While combustor designs vary based on manufacturer, size, and application, many, particularly those of the multiple-can type (an example of which is shown in FIG. 2), and the can-annular type (an example of which is shown in FIG. 3), carry out combustion via an array of cylindrical tubes or "cans" disposed circumferentially around the turbine shaft. In the multiple-can type combustor, each can's air intake is mechanically coupled to a corresponding outlet port of the compressor. In contrast, the can-annular type combustor is typically configured so that each can's air intake is open to a common single annulus connected to the compressor outlet. In either case, products of combustion are discharged from each can through a transition duct where they are then distributed around a 360° arc into the first stage of the turbine.

Each can combustor typically has a combustor chamber fed by one or more air-fuel nozzles disposed about the circumference of an inlet plane of the can combustor in an annular configuration. The air-fuel nozzles introduce a mixture of air and fuel into the combustor chamber. In many cases, an air-fuel pilot burner is additionally disposed along the combustor axis. The air-fuel pilot burner, which is employed to enhance combustion stability, may be of either a pre-mix design or a nozzle-mix (i.e., diffusion or non-premix) design. The combination of premix nozzles and pilot burner is often collectively referred to as a burner, and each can combustor usually includes its own burner or group of burners.

Typically, a premix nozzle includes a fuel injector that discharges fuel into a corresponding air stream. Often, the nozzle is arranged as an annular nozzle that includes one or more fuel injectors arranged in an annular configuration surrounded by an air annulus around a central air-fuel pilot burner. The burner helps combust the mixture of air and fuel injected into the combustion chamber of a can of the combustion section to form the hot gas for feeding to the turbine.

SUMMARY

It is desirable for environmental reasons to run a gas turbine system so that its combustors or combustor section operate using lean combustion. The use of lean combustion can refer to a condition in which there is excess air, or oxygen, for combustion relative to the fuel fed to the combustion chamber for combustion. Operating in a lean combustion condition can help reduce nitrous oxide ($NO_x$) formation, which results in a more environmentally friendly exhaust to be output from the gas turbine system. However, lean combustion operation can result in instabilities. These instabilities can result in combustor pressure oscillations, which can also be referred to as vibrations, due to the lack of sufficient uniformity in a continuous burn, or combustion of the fuel. The oscillations, or vibrations, which can be caused from these instabilities, can cause mechanical damage to the gas turbine system. We have determined that such a problem can be better addressed by improving lean combustion stability to greatly reduce combustion instability issues. The reduction of combustion instability can greatly reduce combustor oscillations or vibrations to prolong the life of gas system components and improve operational performance of the gas turbine system. In some embodiments, a flow of hydrogen ($H_2$) gas can be injected into a first wake region of an air-fuel injector (also called air-fuel burner) within a combustion chamber that is formed downstream of where a swirled air-fuel stream was fed into the combustion chamber via a premix burner nozzle. The hydrogen can be injected so that the first wake region interacts with one or more second wakes of a secondary wake region formed between the location at which the hydrogen is injected into the combustion chamber and the first wake region within the combustion chamber. The injection of the hydrogen can form at least one second wake in the combustion chamber via combustion of the injected hydrogen. The one or more second wakes can be formed between the hydrogen injector and the first wake region as well as between the outlet of the hydrogen injector and a position at which a swirling flow of the mixture of fuel and air crosses a discharge plane of the outlet for hydrogen injection. This can result in an interaction between one or more first wakes of the first wake region and one or more second wakes that can facilitate improved combustion stability as a consequence of the combustion of hydrogen interacting with combustion gases of the first wakes. This interaction can include, for example, activated gas in the one or more first wakes from combustion of fuel communicating heat and active chemical species with the one or more second wakes.

We have determined that the injection of hydrogen into a region of hot excess air can often, if not always, result in the rapid ignition of hydrogen for combusting the hydrogen. We believe this is due to the relatively high chemical reactivity of hydrogen, its wide range of flammability and elevated flame temperature. We have determined that the injection of hydrogen into the combustion chamber and its resultant combustion, can initiate a flame-stabilizing chain reaction that can subdue combustion driven oscillations that can occur within a combustion chamber during the combustion of the fuel therein. We have determined that this is particularly applicable to embodiments in which the injection of the hydrogen gas occurs at a location within the combustion chamber that is adjacent to a swirled air-fuel mixture output from a nozzle, while also being separated from this swirled air-fuel mixture output and being positioned downstream of the output flow of the air-fuel mixture output from the nozzle so that the injected hydrogen can interact with the fuel and air within the combustion chamber in a wake region within the combustion chamber.

In some embodiments, hydrogen can be injected into a combustion chamber at a velocity equal to or greater than 100 m/sec, preferably at a velocity equal to or greater than 300 m/sec and most preferably equal to the local speed of sound of hydrogen, through at least one opening (e.g. at least one port, orifice, nozzle, or other type of injection outlet) so that the hydrogen is injected into the first wake of the premix flame jet within a combustion chamber. Of course, other embodiments may utilize a different output velocity to meet a particular set of design criteria.

We have determined that embodiments that employ a high nozzle velocity for the injected hydrogen can be particularly effective for stabilizing lean combustion and minimizing combustor driven oscillations, or vibrations. For example, we have found that the kinetic energy of each high velocity hydrogen jet can act as a pump that entrains local mass in proportion to its velocity while generating local turbulence that can enhance mixing. The enhanced mixing can reduce temperature stratifications; which can lower the peak flame temperatures within the combustion chamber and help to lower $NO_x$ emissions. We have also determined that the high velocity jet(s) of hydrogen injected into the combustion chamber can help to convectively transport the heat released during hydrogen combustion away from the hydrogen injector outlet, which can help prevent nozzle overheating.

In some embodiments of my hydrogen injector arrangement, a hydrogen injector can have an outlet in fluid communication with a combustion chamber that has a single hydrogen outlet orifice that can be utilized for injecting hydrogen into the combustion chamber. In other embodiments, the hydrogen injector can have an outlet that utilizes multiple output orifices for injecting the hydrogen into the combustion chamber in multiple jets. These jets of hydrogen can be high velocity hydrogen jets that are injected to create a multiplicity of secondary jet wake flows that can each entrain lean premix fuel reactants and hot products of combustion into the hydrogen jet. We determined that the formed hydrogen—entrained gas mixture can be readily ignited within the relatively low velocity secondary wake region due to the low ignition energy of hydrogen, the excess oxygen available in the entrained mass and the elevated temperature of combustion products. The multiplicity of secondary wake ignition sources can generate an array of small flame structures during combustion in the combustion chamber that can each act as a miniature "pilot" flame to adjacent hydrogen jets. We have determined that this effect from use of multiple injection jet of hydrogen can provide synergistic effects among the adjacent hydrogen jets to provide a much higher level of ignition reliability and flame stability as compared to utilization of only a single hydrogen jet of the same mass flow rate into the combustion chamber.

Embodiments of a hydrogen injection arrangement, gas turbine system having at least one such arrangement, combustor for a gas turbine system having at least one hydrogen injection arrangement, and methods of making and using the same can be provided to meet a particular set of design and performance criteria. In a first aspect, a hydrogen injection arrangement for injecting hydrogen into a combustion chamber of a combustor of a gas turbine system can include an outer conduit having an outlet in fluid communication with the combustion chamber. The outer conduit can be configured so that a mixture of fuel and air is passable into the combustion chamber via the outlet of the outer conduit. The hydrogen injection arrangement can also include an inner hydrogen injection conduit positioned adjacent to the outer conduit. The outer conduit can be positioned such that the outlet of the outer conduit is around an outer periphery of an outlet of the inner hydrogen injection conduit that is in fluid communication with the combustion chamber. In some embodiments, the injection arrangement may only include the inner conduit and the outer conduit. In other embodiments, there may be one or more intermediate annular conduits positioned between the inner conduit and the outer conduit (e.g. a water injection conduit and/or a purge air conduits positioned between the inner conduit and the outer conduit, etc.). The inner hydrogen injection conduit can be configured such that at least one jet of hydrogen is injectable into the combustion chamber via the outlet of the inner hydrogen injection conduit.

In a second aspect, the outlet of the inner hydrogen injection conduit can be positioned to output the at least one jet of hydrogen into a first wake region within the combustion chamber that is downstream of the outlet of the inner hydrogen injection conduit and upstream of a position within the combustion chamber at which the mixture of fuel and air output from the outlet of the outer conduit crosses a discharge region of the outlet of the inner hydrogen injection conduit within the combustion chamber. It should be appreciated that crossing of the discharge region by the mixture of fuel and air can include passing through this discharge region, entering the discharge region, and/or moving along the discharge region. The position at which the mixture of fuel and air crosses the discharge region can be a location or region within the combustion chamber at which the mixture of fuel and air output from the outlet of the outer conduit crosses the discharge region of the outlet of the inner hydrogen injection conduit within the combustion chamber. The inner hydrogen injection conduit can be positioned and configured such that a secondary wake region is formed by the at least one jet of hydrogen adjacent to the first wake region or as it enters the first wake region.

In a third aspect, the outer conduit can include at least one swirler to generate a swirling flow for the mixture of air and fuel to be output from the outlet of the outer conduit.

In a fourth aspect, the secondary wake region can be located between the outlet of the inner hydrogen injection conduit and the position within the combustion chamber at which the mixture of fuel and air output from the outlet of the outer conduit crosses the outlet of the inner hydrogen injection conduit while the fuel of the mixture combusts in the combustion chamber.

In a fifth aspect, the outlet of the inner hydrogen injection conduit is a single orifice and the inner hydrogen injection conduit has at least one cavity upstream of the single orifice. The at least one cavity can have a depth, a cavity length, and a cavity trailing edge distance, which is a distance a downstream end of the cavity is from the outlet of the inner hydrogen injection conduit. In a sixth aspect, the cavity depth can be greater than or equal to a radius of the orifice of the outlet of the inner hydrogen injection conduit and also be less than or equal to a diameter of the orifice of the outlet of the inner hydrogen injection conduit. The cavity length can be a value so that a ratio of the length to the depth is between 1 and 4, and the cavity trailing edge distance being a value so that a ratio of the cavity trailing edge distance to the diameter is no more than 5. In a seventh aspect, the cavity dimensions can differ from the parameters of the sixth aspect.

In an eighth aspect, the outlet of the inner hydrogen injection conduit can include a nozzle with at least one central orifice to form at least one central jet of hydrogen to inject hydrogen into the combustion chamber and multiple outer orifices to form multiple non-central jets of hydrogen to inject hydrogen into the combustion chamber. In some embodiments, the one or more central jets can be output to flow in an axial direction and the non-central jets of hydrogen can be output so they flow in non-axial directions. In a ninth aspect, the outer orifices can be configured so that each of the non-central jets of hydrogen is output in a flow direction that flows at an angle to a flow direction of the at least one central jet of hydrogen, the angle being greater than 0° and less than 90° or greater than 15° and less than 60°. In yet a tenth aspect, other ranges for this angle can be utilized. In an eleventh aspect, the at least one central orifice can be configured to form the at least one central jet of hydrogen so the at least one central jet of hydrogen has a velocity of at least 100 m/s and the outer orifices are configured to form the non-central jets of hydrogen to have velocities that are at least 100 m/s.

In a twelfth aspect, the outlet of the inner hydrogen injection conduit can be a single orifice configured to inject the hydrogen as a jet of hydrogen that has a velocity of at least 100 m/s.

It should be appreciated that, in a thirteenth aspect, the first aspect can be combined with a combination of features included in the second aspect, third aspect, fourth aspect, fifth aspect, sixth aspect, seventh aspect, eight aspect, ninth aspect, tenth aspect, eleventh, and/or twelfth aspect. For example, in some versions of the thirteenth aspect, a combination of the first, second, third, and fourth aspects can be provided. In another version of the twelfth aspect, a combination of the first through sixth aspects can be utilized. In yet another version of the thirteenth aspect, the first through fourth aspects and the eighth and ninth aspects and the eleventh aspect can be utilized. In yet another version of the thirteenth aspect, the first through sixth aspects and the eleventh aspects can be utilized.

In a fourteenth aspect, a gas turbine system can be provided that includes a combustor configured to feed heated gas to a turbine and a hydrogen injection arrangement connected to the combustor. The hydrogen injection arrangement can be a hydrogen injection arrangement of any of the first through thirteenth aspects discussed above.

In some embodiments of the first aspect through the fourteenth aspect, the hydrogen injection arrangement can be configured as a burner for a combustor or be incorporated into such a burner.

In a fifteenth aspect, a method of injecting hydrogen into a combustion chamber of a combustor of a gas turbine system is provided that can include outputting a mixture of fuel and air into the combustion chamber via a outlet of an outer conduit in fluid communication with the combustion chamber, and injecting at least one central jet of hydrogen into the combustion chamber via an outlet of an inner hydrogen injection conduit that is in fluid communication with the combustion chamber. The outer conduit can be positioned such that the outlet of the outer conduit is around an outer periphery of the outlet of the inner hydrogen injection conduit.

In a sixteenth aspect, the method can be utilized so that the at least one central jet of hydrogen is injected into a secondary wake region within the combustion chamber that is downstream of the outlet of the inner hydrogen injection conduit and upstream of a position within the combustion chamber at which the mixture of fuel and air output from the outlet of the outer conduit crosses a discharge region of the outlet of the inner hydrogen injection conduit within the combustion chamber. The crossing of the discharge region can include passing through the discharge region, entering the discharge region, and/or moving along the discharge region. In at least some version of this aspect the at least one central jet of hydrogen can be injected at a velocity of at least 100 m/s.

In a seventeenth aspect, the method can also include generating a swirl of air via at least one swirler to generate a swirling flow for the mixture of air and fuel prior to outputting the mixture of air and fuel from the outlet of the outer conduit. In such an aspect, or in conjunction with the fifteenth and/or sixteenth aspects, the secondary wake region can be between the outlet of the inner hydrogen injection conduit and the position within the combustion chamber at which the mixture of fuel and air output from the outlet of the outer conduit crosses the outlet of the inner hydrogen injection conduit while the fuel of the mixture combusts in the combustion chamber.

In an eighteenth aspect, the method of the fifteenth, sixteenth, or seventeenth aspects can be employed such that the outlet of the inner hydrogen injection conduit is a single orifice and the inner hydrogen injection conduit has at least one cavity upstream of the single orifice. In such an aspect, the at least one cavity can have a depth, a cavity length, and a cavity trailing edge distance, which is a distance a downstream end of the cavity is from the outlet of the inner hydrogen injection conduit. The cavity depth can be greater than or equal to a radius of the orifice of the outlet of the inner hydrogen injection conduit and also be less than or equal to a diameter of the orifice of the outlet of the inner hydrogen injection conduit, the cavity length can be a value so that a ratio of the length to the depth is between 1 and 4, and the cavity trailing edge distance can be a value so that a ratio of the cavity trailing edge distance to the diameter is no more than 5. Of course, the at least one cavity in a nineteenth aspect can be structured to have other parameters for the cavity length, depth, and trailing edge distance parameters that differ from these parameters as well.

In a twentieth aspect, an embodiment of the method can be employed in situations where the outlet of the inner hydrogen injection conduit includes a nozzle with at least one central orifice to form the at least one central jet of hydrogen to inject hydrogen into the combustion chamber and multiple outer orifices to form multiple non-central jets of hydrogen to inject hydrogen into the combustion chamber. In such aspects, the method can also include injecting the non-central jets of hydrogen into the combustion chamber via the outer orifices of the nozzle. In some embodiments, the one or more central jets of hydrogen can flow in an axial direction while the non-central jets of hydrogen flow in a non-axial direction. The injection of the non-central jets can be performed so they are injected into a secondary wake region within the combustion chamber that is downstream of the outlet of the inner hydrogen injection conduit and upstream of a region within the combustion chamber at which the mixture of fuel and air output from the outlet of the outer conduit crosses a discharge region of the outlet of the inner hydrogen injection conduit within the combustion chamber. The crossing of the discharge region can include passing through this discharge region, entering the discharge region, and/or moving along the discharge region. In a twenty-first aspect, the outer orifices can be configured so that each of the non-central jets of hydrogen are output in a flow direction that flows at an angle to a flow direction of the at least one central jet of hydrogen. This angle can be greater than 0° and less than 90°, greater than 15° and less than 60°, or within another range to meet a particular set of design criteria. In a twenty-second aspect, the at least one central jet of hydrogen can be injected at a velocity of at least 100 m/s and each of the non-central jets of hydrogen can be injected at a velocity that is at least 100 m/s.

In yet a twenty-third aspect of an embodiment of my method of injecting hydrogen into a combustion chamber of a combustor of a gas turbine system, the fifteenth aspect can be combined with any combination of the sixteenth through twenty-first aspects. For example, the method can utilize the fifteenth, sixteenth, seventeenth, and eighteenth aspect. As another example, the method can utilize the fifteenth, sixteenth, seventeenth, twentieth, twenty-first, and twenty-second aspects. In some embodiments the fifteenth aspect through twenty-second aspect of the method, a burner of the combustor can include the outer conduit through which the mixture of air and fuel is passable for being fed to the combustion chamber.

In a twenty-fourth aspect, the method can be employed in conjunction with fuel staging. For example, a twenty-fourth aspect of the method, a second portion of fuel can be fed to the combustion chamber downstream of the outlet of the outer conduit while a first portion of the fuel is fed to the outer conduit for mixing with air therein for forming and outputting the mixture of air and fuel from the outlet of the outer conduit. The flow rate of the first and second portions can be varied during operation of a gas turbine system to provide a desired level of combustion within the combustion chamber. In conjunction with the use of fuel staging, the injection of the at least one central jet of hydrogen can be performed to control or lower the equivalence ratio for combustion of the fuel within the combustor to help provide a lean combustion operation. For example, the at least one central jet of hydrogen can be injected to mix with combustion products as well as the fuel and air mixture in the secondary wake at or below an equivalence ratio of unity. In some embodiments of such an aspect, the injection of hydrogen can be performed so that the ratio of hydrogen to fuel flow rate is provided so that the equivalence ratio is equal to:

$$\frac{m, H2, \text{central, max}}{m, \text{Fuel}} \approx 0.5 * \left[\frac{m, \text{recirc}}{m, \text{total}}\right] * \left[\frac{1-\Phi}{\Phi}\right]$$

where m,H2,central,max is the maximum allowable central hydrogen injection mass flow rate; m,Fuel is the burner fuel flow rate, m,recirc is the mass flow recirculation (i.e. reverse flow) rate in the burner first wake region; m,total is the total burner flow rate and $\Phi$ is the burner equivalence ratio, which is the equivalence ratio accounting for only air and fuel injected into the combustion chamber through the outlet of the outer conduit of the burner. The recirculation gas flow rate (m,recirc) can be a function of the main premix burner swirl number and average axial injection velocity that may either be estimated by empirical correlation (available in the public domain) or via computational fluid dynamics modeling. In embodiments of this aspect, the outer conduit and/or the inner hydrogen injection conduit can be portions of the burner of the combustor.

In yet other embodiments of the twenty-fourth aspect of the method, the injection of hydrogen can be performed to lower the combustor overall equivalence ratio relative to the low equivalence ratio limit attainable without hydrogen to help facilitate extended turbine load reduction and/or to lower combustor $NO_x$ emissions without increasing CO emissions. In such aspects, the injection of hydrogen can be controlled so that the operation of the combustor of the gas turbine system is constrained by the below relationship to control operations of the gas turbine system and/or the combustor:

$$mH2, \text{total} < \left(\frac{\beta prim}{\beta H2}\right) * Mair * \left(\frac{MH2}{Mprim}\right) * (PFR0 - PFR1)$$

where:
mH2,total is the total hydrogen injection rate;
βprim is the molar, air-fuel stoichiometric coefficient for the fuel (e.g. for methane as the fuel, βprim can be equal to 9.52);
MH2, is the molar, air-fuel stoichiometric coefficient for hydrogen;
Mair is the molecular weight of air;
MH2 is the molecular weight of hydrogen;
Mprim is the molecular weight of the fuel;
PFR0 is the fuel to air mass flow ratio prior to hydrogen injection; and
PFR1 is the fuel to air mass flow ratio during hydrogen injection.

In embodiments of this aspect, the outer conduit and/or the inner hydrogen injection conduit can be portions of the burner of the combustor.

In a twenty-fifth aspect, the method can be utilized to lower the overall combustor equivalence ratio via the injection of hydrogen so that the equivalence ratio of the combustion of the fuel occurring in the combustor is reduced due to the injection of hydrogen to a value within a pre-selected desired range of values that can provide for lean combustion. In some embodiments of such aspects, the injection of hydrogen can be performed so that the ratio of hydrogen to fuel flow rate is provided so that the equivalence ratio is equal to:

$$\frac{m, H2, \text{central, max}}{m, \text{Fuel}} \approx 0.5 * \left[\frac{m, \text{recirc}}{m, \text{total}}\right] * \left[\frac{1-\Phi}{\Phi}\right]$$

where m,H2,central,max is the maximum allowable central hydrogen injection mass flow rate; m,Fuel is the burner fuel flow rate, m,recirc is the mass flow recirculation (i.e. reverse flow) rate in the burner first wake region; m,total is the total burner flow rate and $\Phi$ is the burner equivalence ratio, which can be the equivalence ratio accounting for only air and fuel injected into the combustion chamber through the outlet of the outer conduit. The recirculation gas flow rate (m,recirc) can be a function of the main premix burner swirl number and average axial injection velocity that may either be estimated by empirical correlation (available in the public domain) or via computational fluid dynamics modeling. In embodiments of this aspect, the outer conduit and/or the inner hydrogen injection conduit can be portions of the burner of the combustor.

In a twenty-sixth aspect, a method of injecting hydrogen into a combustion chamber of a combustor of a gas turbine system can include outputting a mixture of fuel and air into the combustion chamber via an outlet of an outer conduit in fluid communication with the combustion chamber and injecting at least one jet of hydrogen into the combustion chamber via an outlet of an inner hydrogen injection conduit that is in fluid communication with the combustion chamber. The outer conduit can be positioned such that the outlet of the outer conduit is around an outer periphery of the outlet of the inner hydrogen injection conduit. The method can also include other steps, such as generating a swirl of air via at least one swirler to generate a swirling flow for the mixture of air and fuel prior to outputting the mixture of air and fuel from the outlet of the outer conduit and passing the swirling flow within the combustion chamber to a position at which the mixture of fuel and air within the swirling flow crosses a discharge region of the outlet of the inner hydrogen injection conduit within the combustion chamber. The at least one jet of hydrogen can be injected into a secondary wake region within the combustion chamber that is downstream of the outlet of the inner hydrogen injection conduit and upstream of the position within the combustion chamber at which the mixture of fuel and air within the swirling flow crosses the discharge region of the outlet of the inner hydrogen injection conduit within the combustion chamber. The secondary wake region can be between the outlet of the inner hydrogen injection conduit and the discharge region. The secondary wake region can have at least one second wake that interacts with at least one first wake within a first wake region generated by the swirling flow of the mixture of air and fuel as the fuel combusts inside the combustion chamber. For example, activated gas from combustion of fuel in the at least one first wake can communicate heat and active chemical species with the at least one second wake.

It should also be appreciated that embodiments of a gas turbine system and embodiments of a combustor can be configured to utilize any of the embodiments of a method that can include the fifteenth through twenty-sixth aspects so that the gas turbine system or combustor can perform such a method. Such embodiments can also utilize a hydrogen injection arrangement that incorporates the first through fourteenth aspects. It should be appreciated that the burner of the combustor can include the hydrogen injection arrangement. Moreover, it should be appreciated that any embodiment of the method that utilizes any of the fifteenth through twenty-sixth aspects can utilize at least one hydrogen injection arrangement that incorporates the first through fourteenth aspects.

Other details, objects, and advantages of gas turbines, injection devices for combustion chambers in a gas turbine system, operation of gas turbines, operation of injectors for combustion used in conjunction with a gas turbine system, plants utilizing one or more gas turbine systems, and methods of making and using the same will become apparent as the following description of certain exemplary embodiments thereof proceeds.

BRIEF DESCRIPTION OF THE DRAWINGS

Exemplary embodiments of gas turbines, injection devices for combustion chambers in a gas turbine system, operation of gas turbines, operation of injectors for combustion used in conjunction with a gas turbine system, plants utilizing one or more gas turbine systems, and methods of making and using the same are shown in the drawings included herewith. It should be understood that like reference characters used in the drawings may identify like components.

FIG. 5 is similar to FIG. 4, but further illustrates an exemplary fuel feeding system that can be included in the gas turbine system for feeding fuel to the combustor as well as mixing a portion of the fuel with air to premix the air and fuel before the mixture of air and fuel is output to the combustion chamber 2a via the burner 4.

FIG. 13 is an enlarged schematic view of the exemplary secondary wake zone formed within the combustion chamber 2a illustrated in FIGS. 4 and 5 to better illustrate the exemplary ignition of a hydrogen jet or hydrogen jets 13 that, once ignited, can be passed through this secondary wake region 11 as the injected hydrogen undergoes combustion in this region adjacent to a position within the discharge region 14 at which the mixture of air and fuel output from the outlet 5b of the outer conduit 5 crosses the discharge region 14 of the outlet 7b of the inner hydrogen injection conduit 7 within the combustion chamber 2a.

DETAILED DESCRIPTION OF EXEMPLARY EMBODIMENTS

Figure 1:
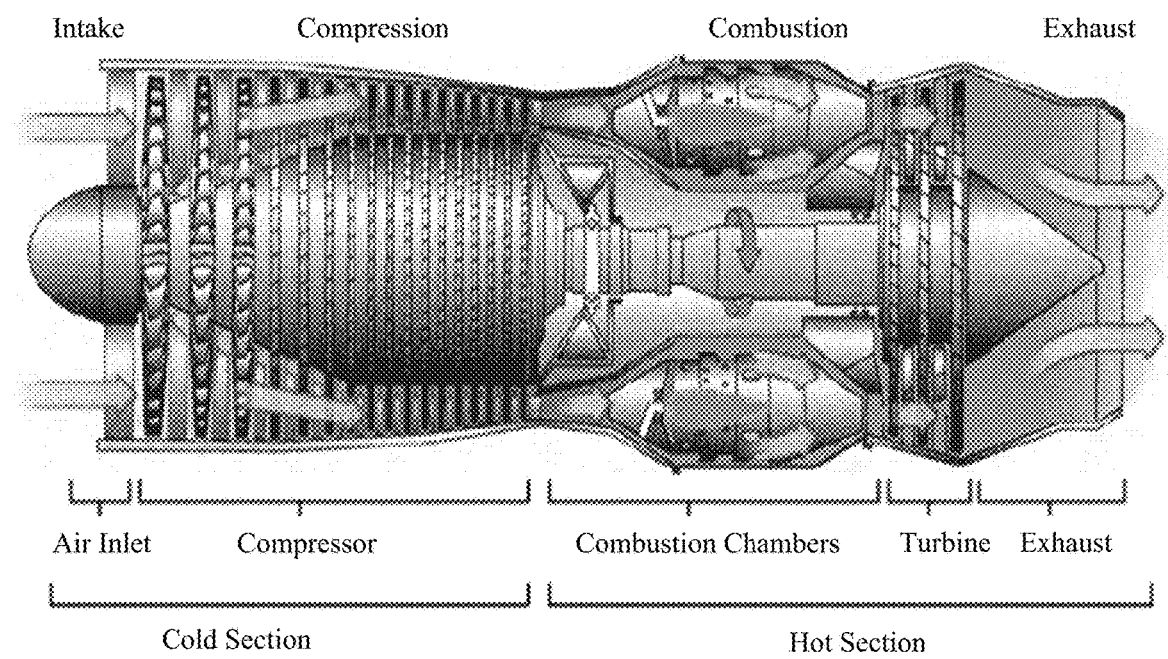
FIG. 1 is a side cross-sectional view of a conventional gas turbine arrangement that can be utilized for industrial power generation.
Figure 2:
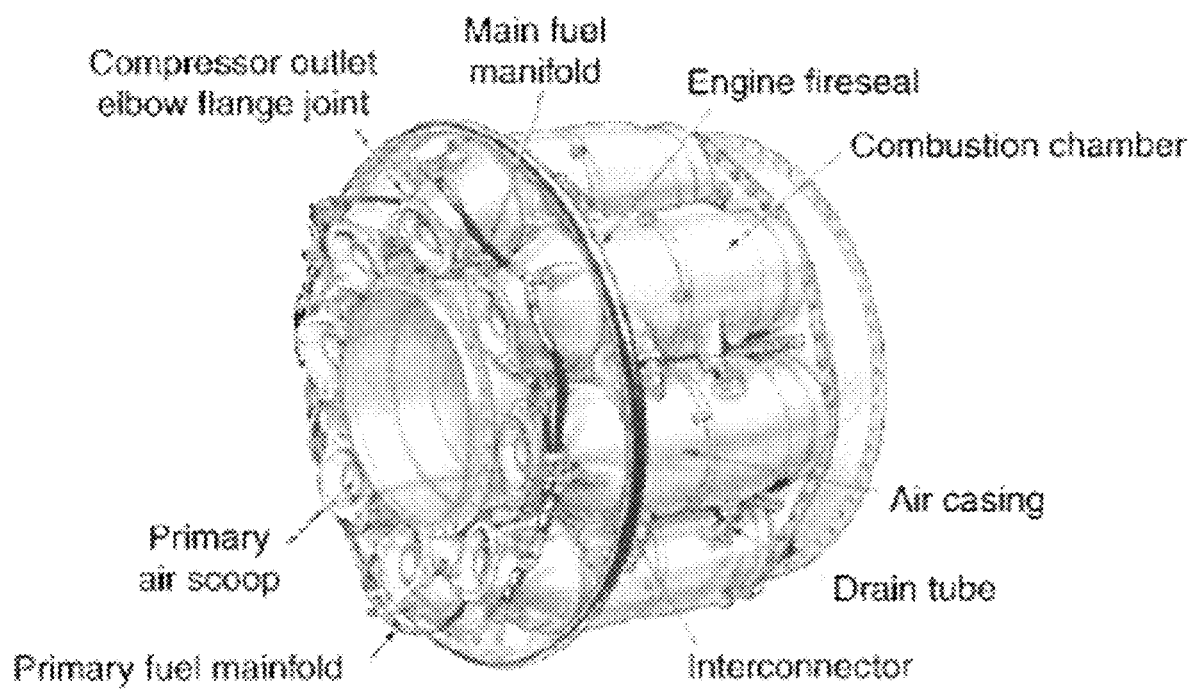
FIG. 2 is a front perspective view of a multiple-can combustor section of the gas turbine arrangement shown in FIG. 1.
Figure 3:
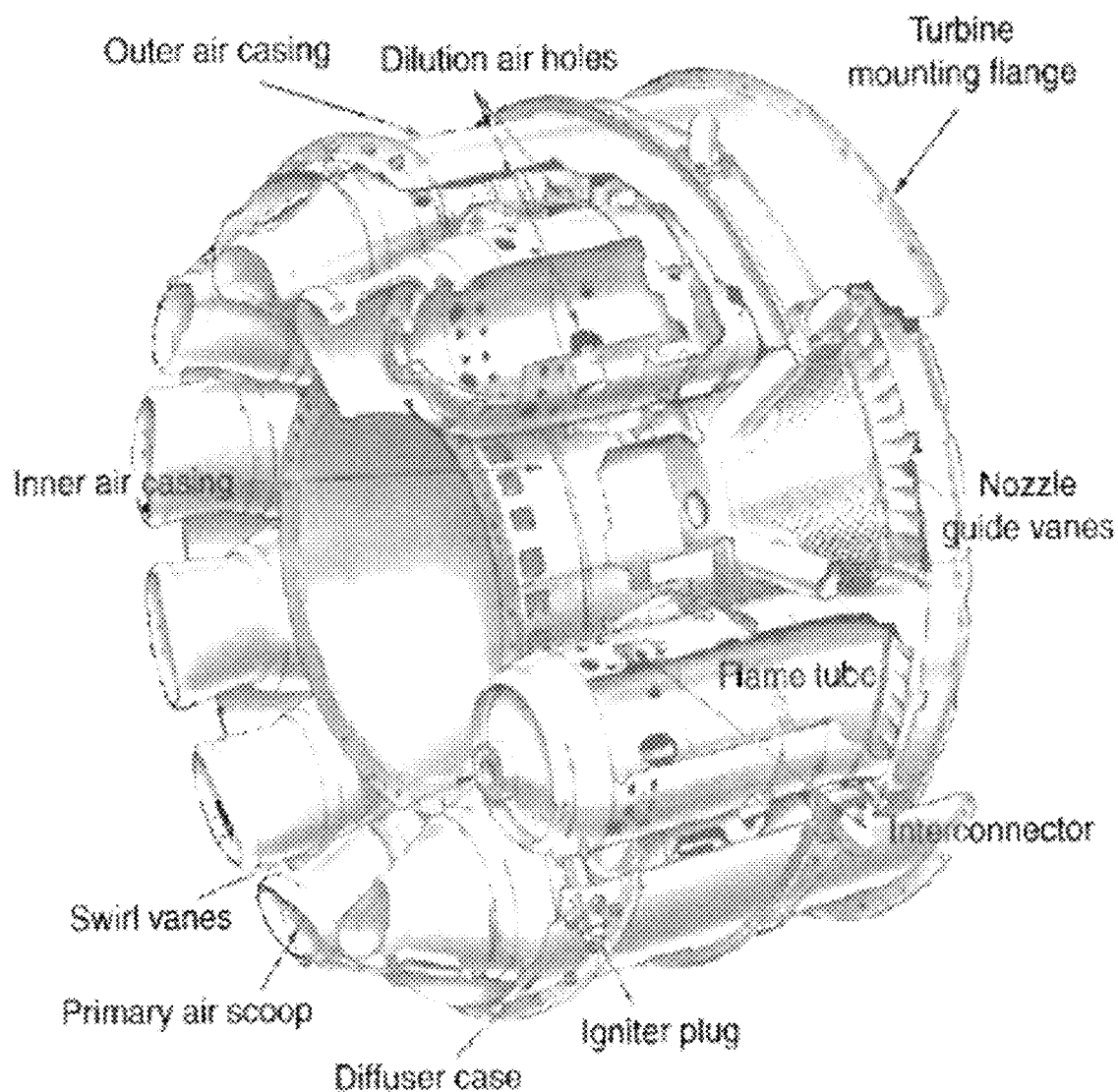
FIG. 3 is a front perspective view of a can-annular combustor section of the gas turbine arrangement shown in FIG. 1. Portions of the combustor section are cut away to better illustrate certain internal components of the section.

Referring to FIGS. 4-14, a hydrogen injection arrangement 1 can be included in a gas turbine system, such as the turbine system shown in FIG. 1 utilizing a multiple can or annular can combustion section arrangement (examples of which are shown in FIGS. 2 and 3). In other embodiments, the hydrogen injection arrangement 1 can be included into a turbine system that utilizes a different type of combustor section. The inclusion of the hydrogen injection arrangement 1 can be provided as part of a retrofit operation of a pre-existing gas turbine system or can be incorporated into a new design for a new gas turbine system or combustor for such a system that is to be installed at an industrial power plant or other type of plant.

Figure 4:
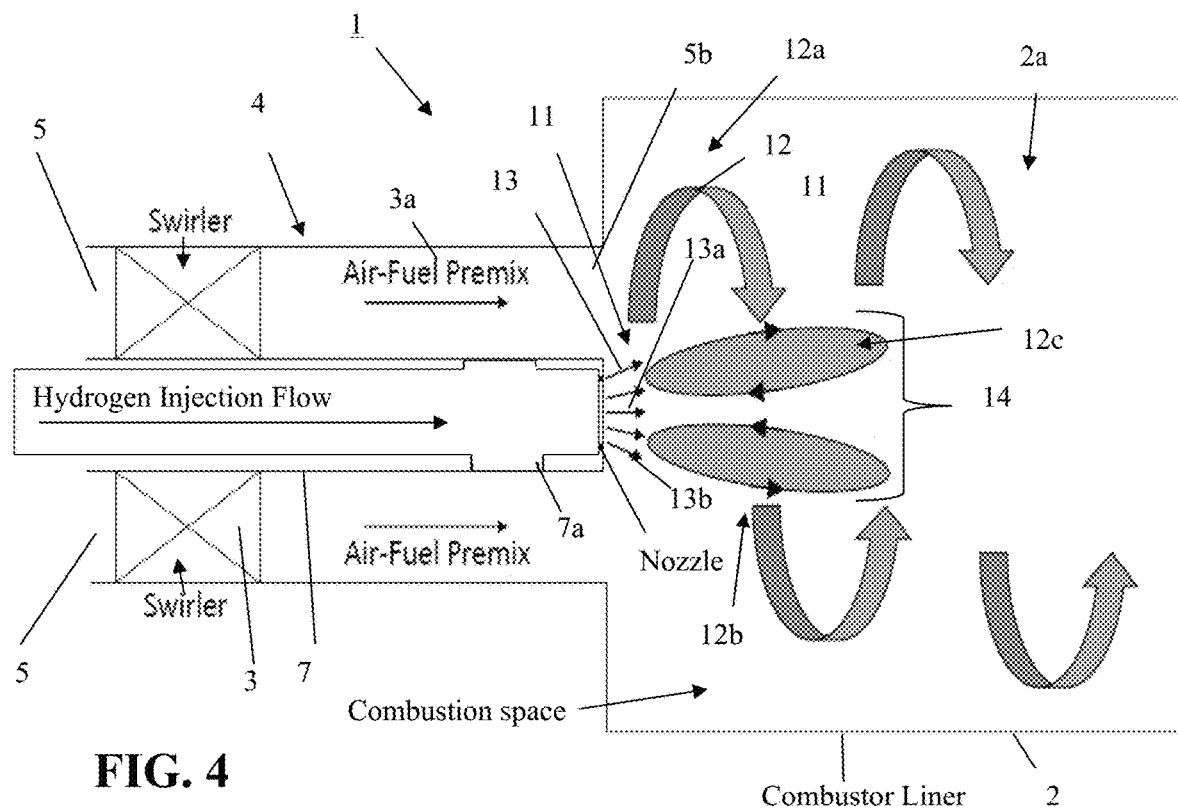
FIG. 4 is a schematic view of a first exemplary embodiment of a hydrogen injection arrangement for inclusion in a combustion section of a gas turbine system.
Figure 5:
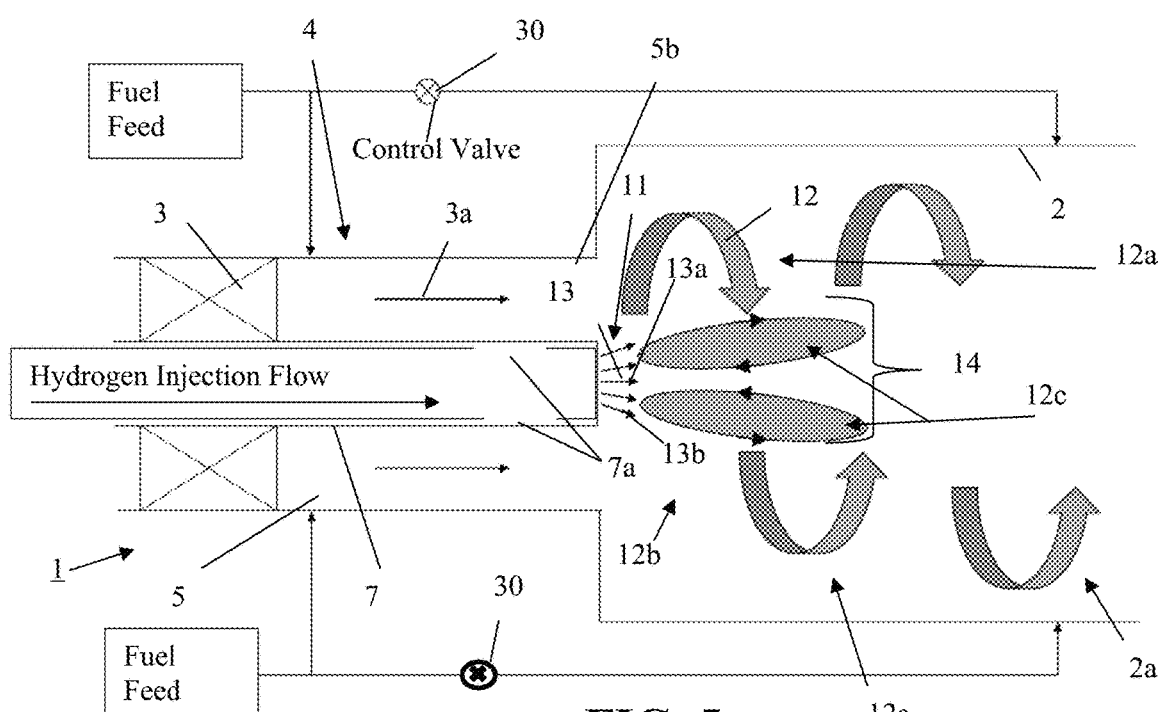
FIG. 5 is a schematic view of the first exemplary embodiment of a hydrogen injection arrangement for inclusion in a combustion section of a gas turbine system.

As may best be seen from FIGS. 4 and 5, the hydrogen injection arrangement 1 can include an injector assembly that includes an outer conduit 5 configured to feed a flow of a mixture of air and fuel 3a (which can also be referred to as an air-fuel mixture) to the combustion chamber 2a of a combustor. The combustion chamber 2a can be defined by a combustion liner 2 of a combustor of a gas turbine system. The combustion chamber 2a provides a combustion space in which combustion of fuel can occur to generate a hot gas for outputting to a turbine of the gas turbine system. At least one swirler 3 can be positioned in the outer conduit 5 to facilitate a swirling flow of the air-fuel mixture 3a to be output into the combustion chamber 2a so that the output mixture of fuel and air includes a swirling output flow 12 of the air-fuel mixture that is injected into the combustion chamber 2a to flow along a pre-selected discharge path therein for combustion of the fuel within the combustion chamber 2a.

The one or more swirlers 3 can be positioned in the outer conduit 5 of the hydrogen injection arrangement 1 to swirl air before it is mixed with fuel. As may best be appreciated from FIG. 5, the fuel can be fed to the air within the outer conduit 5 downstream of the swirler 3 and upstream of the outer conduit outlet 5b at which the mixture of fuel and air 3a is fed into the combustion chamber 2a. The mixture of fuel and air 3a within the outer conduit 5 that is formed can be considered an "Air-Fuel Premix" flow as the air and fuel are mixed before they are output into the combustion chamber for combustion of the fuel within the combustion chamber (e.g. they undergo pre-mixing within the outer conduit between the swirler 3 and the outlet of the outer conduit 5 at which the swirling mixture of air and fuel is fed into the combustion chamber 2a).

A flow of hydrogen can be passed through an inner hydrogen injection conduit 7 for output into the combustion chamber 2a for injection therein as a hydrogen injection flow. The hydrogen injection flow can be output at the outlet 7b of the inner hydrogen injection conduit 7 as at least one jet of hydrogen 13 (e.g. a single jet 13 or multiple jets 13). In some embodiments, the outlet 7b for the inner hydrogen injection conduit 7 can be structured as a nozzle having a single output orifice or a nozzle having multiple output orifices. The outlet 7b of the inner hydrogen injection conduit 7 can be positioned inwardly relative to the outlet 5b of the outer conduit 5 such that the outlet 5b of the outer conduit 5 can be around an outer periphery of the outlet 7b of the inner hydrogen injection conduit 7. For instance, the outlet 5b of the outer conduit 5 can surround the entire periphery of the outlet 7b of the inner hydrogen injection conduit 7 and the inner hydrogen injection conduit 7 can be arranged so its outlet 7b is positioned at a location that is inward relative to the outlet 5b of the outer conduit that is positioned around the periphery of the outlet 7b of the inner hydrogen injection conduit 7. Embodiments can utilize any number of arrangements for the outlets of the inner hydrogen injection conduit 7 and outer conduit 5.

In some embodiments, the outlet 7b of the inner hydrogen injection conduit 7 can be located in a central region or in a center of an annular opening of an annular shaped outlet 5b of the outer conduit 5. The annular shaped opening of the outlet 5b of the outer conduit 5 can be a slot-like shape, a cross shape, an "x" like shape, a "Y" like shape, a "T" like shape, a "W" like shape, a "Z" like shape, an "N" like shape, an "M" like shape, an "F" like shape, an "E" like shape, a "D" like shape, a "C" like shape, a "U" like shape, a "V" like shape, a circular shape, an oval shape, a polygonal shape, or another type of shape. The outlet 7b of the inner hydrogen injection conduit can include a central orifice having a shape that matches the shape of the annular shaped opening of the outlet 5b of the outer conduit 5 and is positioned within the annular opening of the outlet 5b of the outer conduit 5.

In some configurations, there can be one or more other conduits arranged between the inner hydrogen injection conduit 7 and the outer conduit 5. For example, an annular shaped water injection conduit (not shown) can be positioned between the inner hydrogen injection conduit 7 and the outer conduit 5. As another example an annular shaped purge air conduit can be positioned between the inner hydrogen injection conduit 7 and the outer conduit 5. As yet another example, an annular shaped water injection conduit (not shown) as well as an annular shaped purge air conduit can be positioned between the inner hydrogen injection conduit 7 and the outer conduit 5.

Different exemplary outlet configurations for the outlet 5b of the outer conduit 5 and the outlet 7b of the inner hydrogen injection conduit 7 that are configured to be in fluid communication with the combustion chamber 2a of a combustor of a gas turbine system can be appreciated from FIGS. 7-10. These different configurations can include, for example, a slot (FIG. 7), cross, (FIG. 8), zipper (FIG. 9), or annular (FIG. 10) type design. Yet other outlet configurations can be appreciated from FIGS. 6 and 11-13 as well as the other examples discussed herein.

For example, as can be appreciated from FIGS. 6-10, the outlet 7b for the inner hydrogen injection conduit 7 can be a uniform circular or other shape single orifice outlet. The inner hydrogen injection conduit can include at least one intermediate cavity 7a that is positioned upstream of the outlet 7b within the inner hydrogen injection conduit 7. Each cavity 7a can be positioned to adjust a velocity of the hydrogen injection flow as it passes through the inner hydrogen injection conduit 7 towards its outlet 7b so that the flow of the hydrogen over the cavity excites a periodic secondary flow within the cavity that acts to increase the level of turbulence of the hydrogen flow. We have found this cavity excitation and increase in hydrogen jet turbulence to be effective in increasing the rate of jet spreading and momentum transfer of the hydrogen jet with its surroundings as it discharges into the combustion chamber 2a.

Each cavity 7a can be positioned to help magnify jet-wake mass and momentum transport of one or more hydrogen jets 13 injected into the combustion chamber via the outlet 7b of the inner hydrogen injection conduit (as compared to a circular nozzle without such a cavity 7a or without multiple such cavities 7a). Each cavity 7a that is defined in the inner hydrogen injection conduit 7 can include a cavity depth d, a cavity length L, and a cavity trailing edge distance X, which is a distance between the downstream end of the cavity 7a and the outlet 7b. The outlet 7b can be circular in shape and have a diameter D, which is the diameter of the circular orifice through which the hydrogen passes to be directly fed into the combustion chamber 2a.

Figure 6:
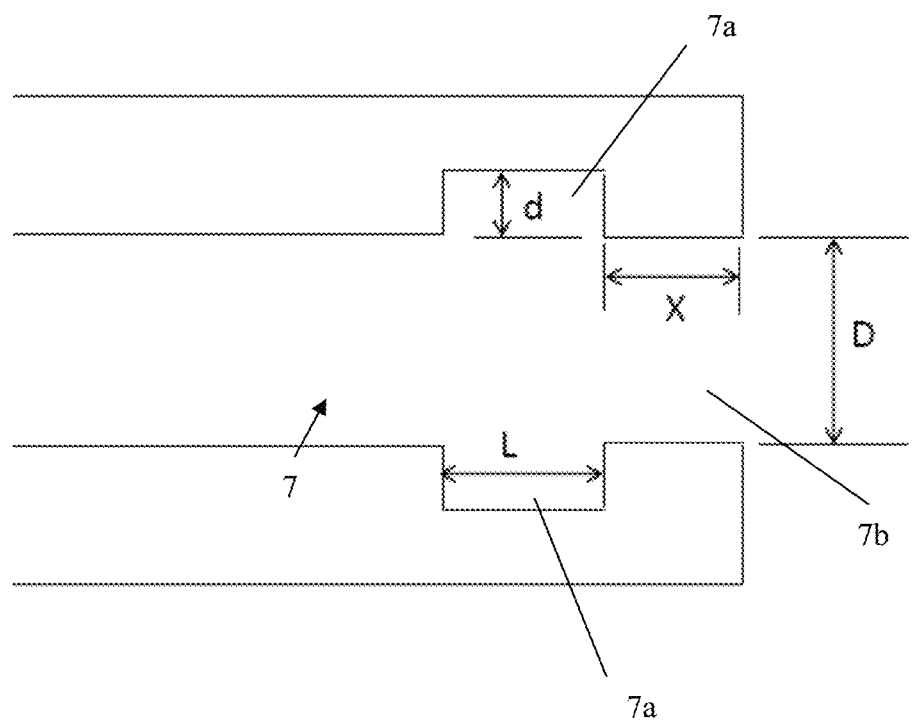
FIG. 6 is a fragmentary schematic view of the first exemplary embodiment of the hydrogen injection arrangement shown in FIGS. 4-5, which is enlarged to illustrate certain aspects of the hydrogen flow injector of the hydrogen injection arrangement.
Figure 7:
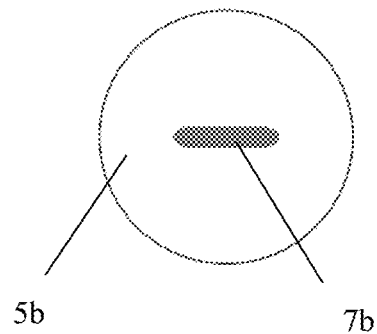
FIG. 7 is an end view of a first exemplary injector outlet arrangement for injecting hydrogen into the combustion chamber 2a at the same time an air-fuel mixture is fed to the combustion chamber 2a that can be utilized in the first exemplary embodiment of the hydrogen injection arrangement.
Figure 8:
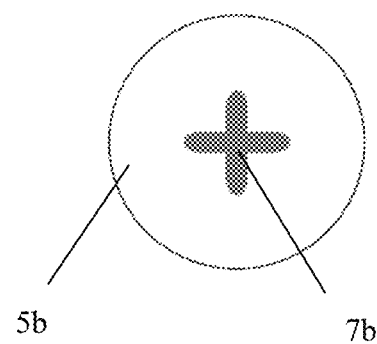
FIG. 8 is an end view of a second exemplary injector outlet arrangement for injecting hydrogen into the combustion chamber 2a at the same time an air-fuel mixture is fed to the combustion chamber 2a that can be utilized in the first exemplary embodiment of the hydrogen injection arrangement.
Figure 9:
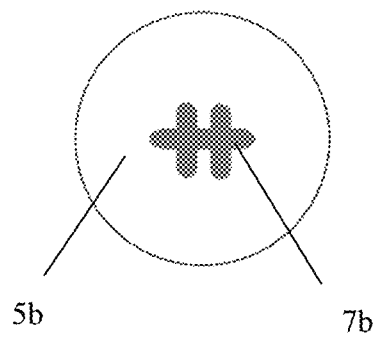
FIG. 9 is an end view of a third exemplary injector outlet arrangement for injecting hydrogen into the combustion chamber 2a at the same time an air-fuel mixture is fed to the combustion chamber 2a that can be utilized in the first exemplary embodiment of the hydrogen injection arrangement.
Figure 10:
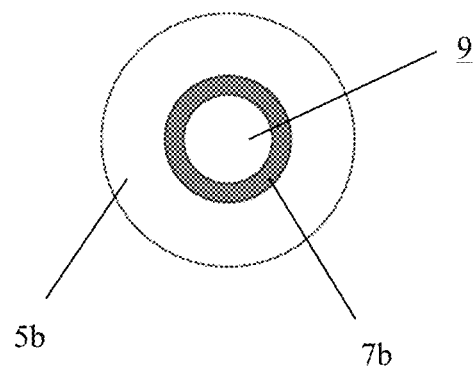
FIG. 10 is an end view of a fourth exemplary injector outlet arrangement for injecting hydrogen into the combustion chamber 2a at the same time an air-fuel mixture is fed to the combustion chamber 2a that can be utilized in the first exemplary embodiment of the hydrogen injection arrangement.
Figure 11:
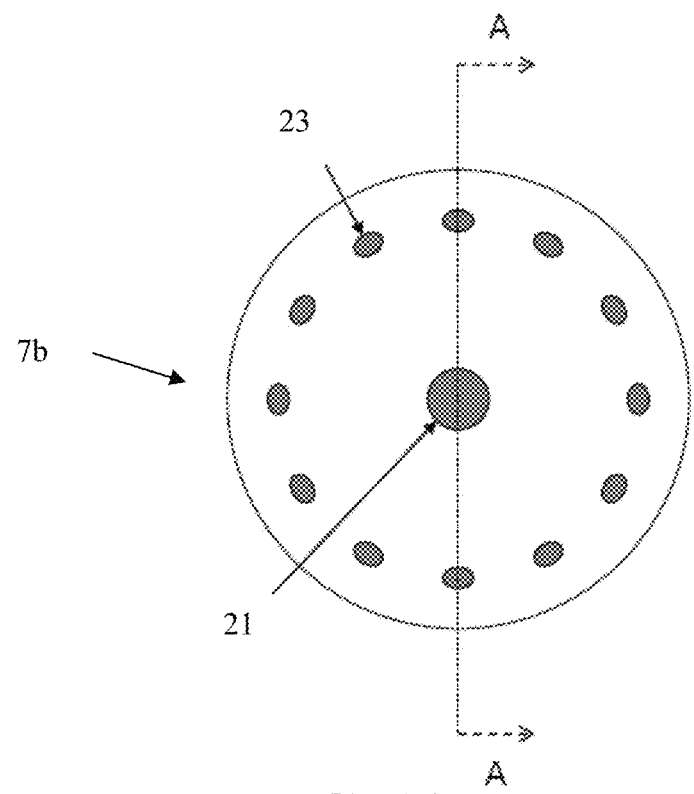
FIG. 11 is a perspective end view of an exemplary injector outlet configuration for injecting hydrogen into the combustion chamber 2a that can be included in the first exemplary embodiment of the hydrogen injection arrangement illustrated in FIGS. 4-6.
Figure 12:
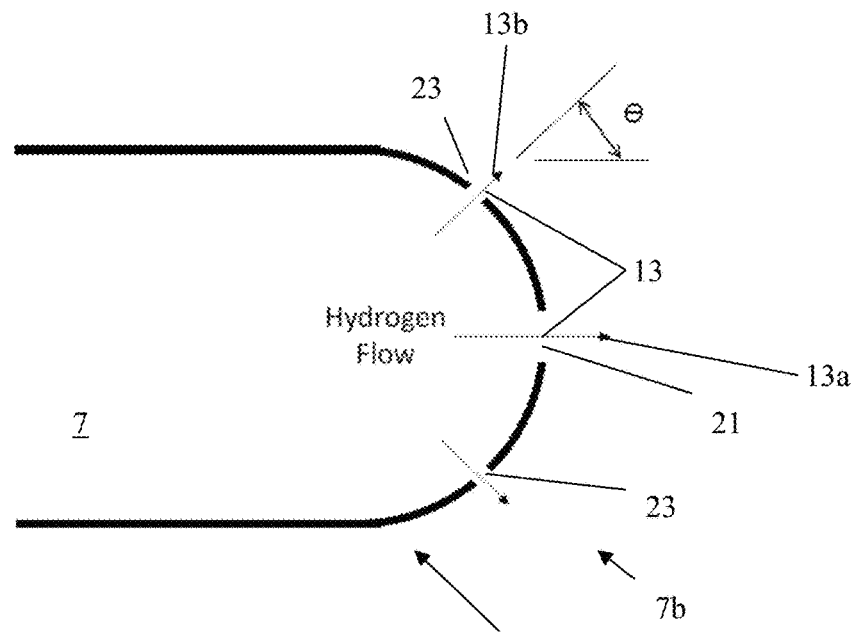
FIG. 12 is a cross-sectional view taken along line A-A in FIG. 11 of the exemplary injector outlet configuration shown in FIG. 11.

As may best be appreciated from FIG. 6, each cavity 7a can be configured to have a particular depth d and length L and also be positioned to have a particular cavity trailing edge distance X from the outlet 7b of the inner hydrogen injection conduit 7. The cavity depth d is preferably less than the diameter D of a circular orifice of the outlet 7b. In some embodiments, the cavity depth d can be greater than or equal to the radius of the orifice of the outlet 7b and also be less than or equal to the diameter D of the orifice of the outlet 7b (e.g. $D/2 \leq d \leq D$). The cavity length L can be selected so that the length L is a value so that the ratio of length L to depth d is between 1 and 4 (e.g. $1 \leq L/d \leq 4$). The cavity trailing edge distance X can be selected so that the ratio of the cavity trailing edge distance X to the diameter D of the outlet 7b is no more than 5 (e.g. $x/D \leq 5$). We have determined that embodiments that utilize the cavity dimensional specifications are often able to provide an improved wake mass and momentum transport that is desirable for the hydrogen injection within the combustion chamber 2a—particularly (but not exclusively) when utilized in conjunction with a uniform sized single orifice outlet 7b for the inner hydrogen injection conduit 7. The hydrogen output from the outlet 7b can be output as a hydrogen jet 13 of hydrogen gas that can be output at a pre-selected injection flow rate. The speed of the hydrogen jet 13 can be equal to or greater than 100 m/s, greater than or equal to 300 m/s, or a flow velocity that is up to the local speed of sound of hydrogen through the injector orifice defining the hydrogen gas outlet 7b.

The outlet 7b for the inner hydrogen injection conduit 7 can also be configured to have multiple spaced apart orifices for injection of hydrogen gas jets 13 into the combustion chamber 2a. It should be appreciated that each jet 13 of the hydrogen gas that is injected can be a flow of hydrogen gas that is output at a relatively high speed velocity. In some of these embodiments, the velocity of each jet can be equal to or greater than 100 m/s, greater than or equal to 300 m/s, or a flow velocity that is up to the local speed of sound of hydrogen through the injector orifice of the nozzle defining the outlet 7b.

The outlet 7b having a nozzle configuration to provide multiple jets 13 of hydrogen gas for injection into the combustion chamber 2a can be configured to have multiple injection zones. The injection zones can include a first central injection zone having at least one central injection jet of hydrogen 13a that is directed in a direction that is parallel to an axis of the burner 4 (e.g. an axial flow direction along which the flow of fuel, air and hydrogen pass through the outer conduit 5 and inner hydrogen injection conduit 7 for being injected into the combustion chamber 2a). In some embodiments, the first zone may just have a single central orifice 21. However, it is contemplated that other embodiments could include multiple spaced apart central orifices 21 for providing a first zone of multiple central injection jets of hydrogen 13a.

The hydrogen gas injection zones for the nozzle defining the outlet 7b can also include a second zone. The second zone can be configured so that there are multiple second zone injection orifices 23 arranged along an outer circumference surrounding a periphery of at least one first zone central orifice 21 through which the at least one central injection jet of hydrogen 13a is output into the combustion chamber 2a. The second zone injection orifices 23 can be positioned to output non-central jets of hydrogen 13b so each of these jets are output at an angle θ of greater than 0° and less than 90° relative to the axis of the burner 4 (e.g. non-axial flow directions) and/or a non-zero angle relative to the flow direction of a central injection jet of hydrogen 13a such that the non-central jet of hydrogen 13b is output in a flow direction that flows at an angle to the flow direction of the central jet of hydrogen 13a at an angle θ that is greater than 0° and less than 90°. The outer second zone orifices 23 can be arranged so that the angle θ at which the non-central jets of hydrogen 13b are output can range from greater than 0° to less than 90°, or more preferably can range from greater than or equal to 15° and less than or equal to 60°. Of course, outer second zone orifices 23 can be arranged and configured so that the angle θ at which the non-central jets of hydrogen 13b are output can be within a different range, such as, for example, a range of greater than or equal to 10° and less than or equal to 70°, a range of greater than or equal to 5° and less than or equal to 80°, or some other range that may better meet a particular set of design criteria and the particular wake flow dynamics that may be present in a particular combustion chamber 2a for a particular operation of a gas turbine system.

In some embodiments, the one or more first zone central orifices 21 can emit one or more jets of hydrogen 13a so that they all flow in an axial direction and the outer second zone orifices 23 can emit the non-central jets of hydrogen 13b so that they all flow in non-axial directions. In other embodiments, the at least one first zone central orifice 21 and outer second zone orifices 23 can be arranged and configured so that at least one jet of hydrogen 13a can flow in an axial direction at least some of the non-central jets of hydrogen 13b can be output so that they flow in one or more non-axial directions.

The spaced apart peripheral second zone injection orifices 23 can be positioned so that a series of these orifices extend around a periphery of the at least one first zone central orifice 21 so that an entirety of the periphery is surrounded by the spaced apart second zone injection orifices 23 (an example of which may best be seen from FIG. 11) or at least a portion of the periphery of the at least one first zone central orifice 21 is surrounded by the second zone injection orifices 23. In yet other embodiments, an outlet 7b for the inner hydrogen injection conduits 7, can be configured to only include outer injection orifices 23 such that there is no central injection jet of hydrogen 13a nor any first zone central zone orifice 21 defined in the outlet 7b.

The outlet 7b of the inner hydrogen injection conduit 7 be configured so that the one or more jets of hydrogen 13 interact with the prevailing flow field 12a generated by the swirling output flow 12 of the mixture of air and fuel output from the outlet 5b of the outer conduit 5 when that output flow 12 crosses the discharge region 14 of the outlet 7b of the inner hydrogen injection conduit 7 within the combustion chamber 2a at a location that is spaced apart from and downstream of the outlet 7b. For example, the prevailing flow field 12a can be generated from the swirling flow of the mixture of fuel and air swirling within the combustion chamber 2a and passing across and in front of the outlet 7b of the inner hydrogen injection conduit 7a at a position within the discharge region 14 that is spaced apart and downstream from the outlet 7b that is within the combustion chamber 2a. This position within the discharge region 14 can be a location within the combustion chamber 2a or a region within the combustion chamber 2a. A first wake region 12b of fluid can have at least one first wake 12c that is generated by this swirling flow of the mixture of air and fuel as the fuel combusts inside the combustion chamber 2a adjacent to and/or in the discharge region 14 of the inner hydrogen injection conduit 7 as the output flow 12 crosses the discharge region 14.

The hydrogen injected into the combustion chamber 2a via the outlet 7b of the inner hydrogen injection conduit 7 can mix with the air and fuel as well as combustion products (e.g. CO2, CO, water vapor, etc.) from combustion of the fuel that can be directed into the discharge region 14 of the inner hydrogen injection conduit 7 within the combustion chamber 2a as a result of the first wake(s) 12c of fluid formed via combustion of the fuel occurring in the prevailing flow field 12a within the first wake region 12b adjacent the discharge region 14 of the inner hydrogen injection conduit 7. The hydrogen can combust when mixing with the air and generate a secondary wake region 11 in the discharge region 14 of the inner hydrogen injection conduit 7 between the location at which the prevailing flow field 12a of the air-fuel mixture crosses the discharge region 14 of the inner hydrogen injection conduit 7 within the combustion chamber 2a and the outlet 7b of the inner hydrogen injection conduit 7.

Figure 13:
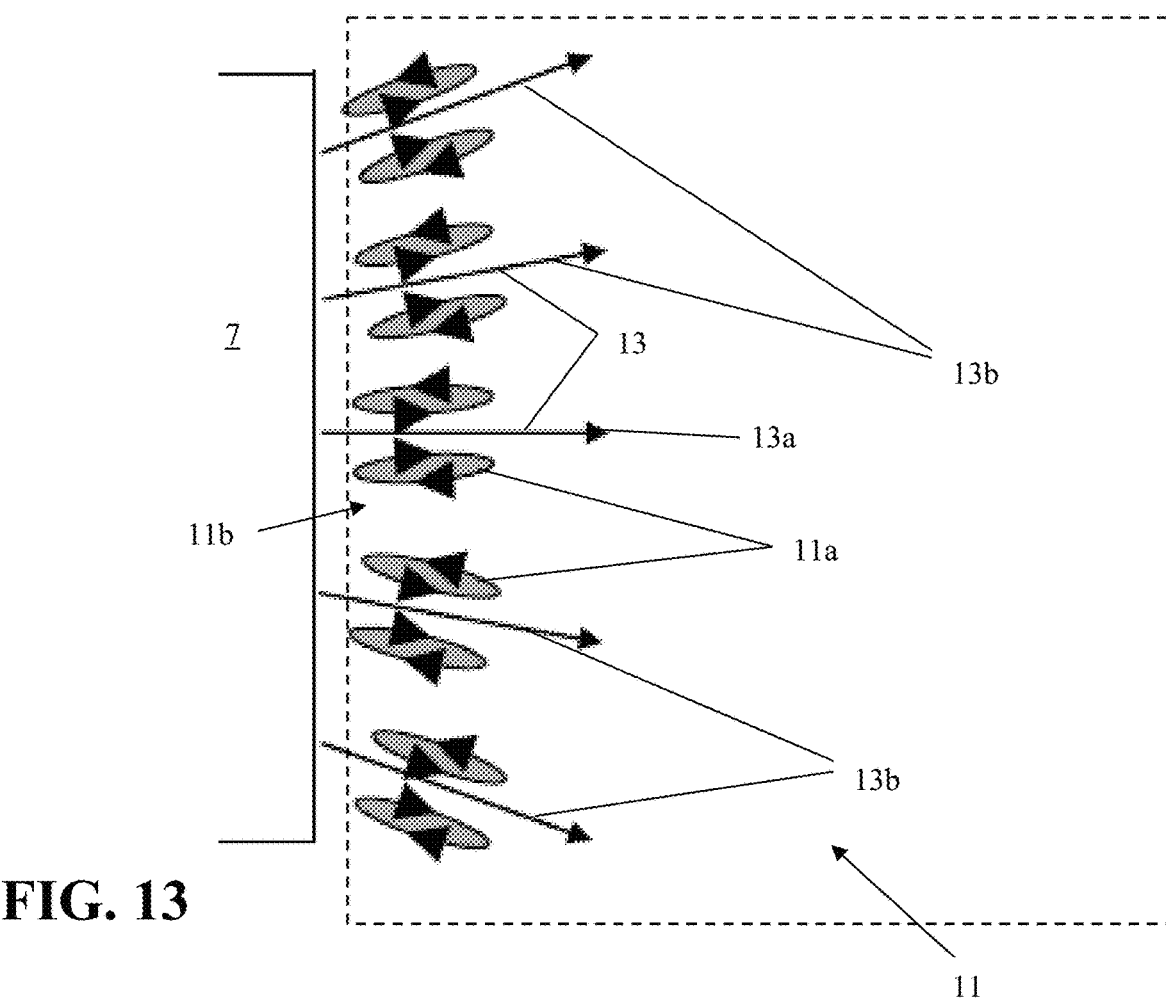
Figure 14:
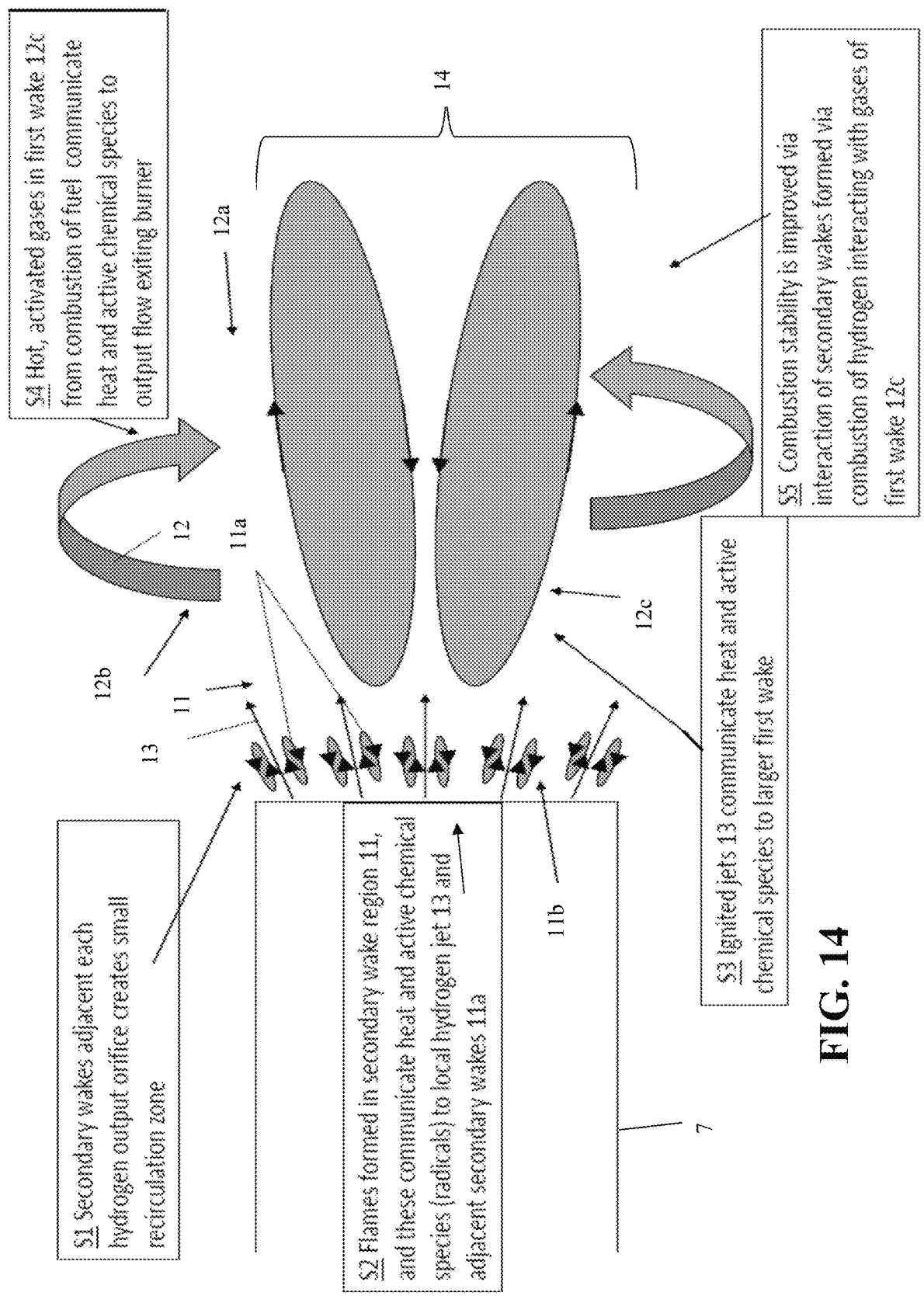
FIG. 14 is a schematic flow chart illustrating an exemplary process by which an exemplary ignition of hydrogen jets 13 can pass through the secondary wake region 11 and interact with at least one first wake 12c of a first wake region 12b as the hydrogen undergoes combustion and the mixture of air and fuel output from the outlet 5b of the outer conduit undergoes combustion of the fuel as this mixture crosses into the discharge region 14 of the outlet 7b of the inner hydrogen injection conduit 7.

As may best be seen from FIGS. 13 and 14, the combustion of the hydrogen within the one or more jets 13 of hydrogen can generate an array of small flame structures 11b that forms via fluid and chemical communication between secondary wakes 11a of adjacent jets of hydrogen within the discharge region 14. The secondary wakes 11a can also be referred to as second wakes.

The secondary wakes 11a can be formed within the combustion chamber 2a between the first wake region 12b and the outlet 7b of the inner hydrogen conduit and also between the position at which the mixture of fuel and air within the swirling output flow 12 of the mixture of air and fuel crosses the discharge region 13 of the outlet 7b of the inner hydrogen injection conduit 7 within the combustion chamber 2a and the outlet 7b of the inner hydrogen injection conduit 7.

The small flame structures 11b can be provided by the relatively high nozzle velocity hydrogen jets 13, which can create a multiplicity of secondary jet wake flows 11a that can each entrain lean premix air-natural gas reactants and hot products of combustion into the hydrogen jet 13 for combustion of the hydrogen in the combustion chamber 2a to form the small flame structures 11b in the flows of the secondary jet wakes 11a. These small flame structures 11b can help provide improved mixing of air and fuel due to the combustion of the hydrogen while also helping to transport heat from the combustion away from the burner 4 due to the transport of momentum provided by the velocity of the hydrogen jets in combination with the combustion of the hydrogen to form the flame structures. The combustion of hydrogen within the secondary wake region 11 can help avoid zones of decreased mixing of air and fuel to mitigate or avoid combustion instability from the fuel combusting in the combustion chamber.

For example, the interaction of the hydrogen combusting in a secondary wake region 11 located in the combustion chamber 2a can help improve flame stability of the burner 4 and combustion stability within the combustion chamber 2a. For instance, the one or more central injection jets of hydrogen 13a can be output in a flow direction that is opposed to the streamline of the reverse flow field generated by the swirling output flow 12 of the mixture of air and fuel output from the outlet 5b of the outer conduit 5 of the burner 4 generated via the one or more swirlers 3 of the burner 4 can interact with this first wake region inside the combustion chamber 2a. A detailed nature of this flow interaction between the injected hydrogen and the swirling flow of the air-fuel mixture can be dependent on the relative momenta of the hydrogen jet(s) 13 and the recirculated flow along the jet burner axis. However, We have determined that the presence of high shear rates, high turbulence intensity, and opposing flows can provide an efficient method by which mixing and subsequent combustion can occur that provide viable energy and chemical radical species as a result of the combustion which is then communicated fluidically through the first wake recirculation flow to the peripheral hydrogen jets, if present, as well as the swirling flow of air and fuel from the main burner as the mixture of air and fuel enters into the combustion space via the outlet 5b of the outer conduit.

Hydrogen introduced into the combustion chamber 2a via the outer injector orifices 23 can further enhance such an effect to help provide a further improvement in lean combustion stability. The divergent non-central jets of hydrogen 13b that can be output in flow directions that are nominally parallel to the shear layer between the toroidal recirculation vortex and the swirling flow 12 of the air-fuel mixture discharging from the outlet 5b of the outer conduit 5 can create a multiplicity of diffusion flames whose reaction rates are augmented due to the presence of the hydrogen as well as the heat and radicals convected from the reaction zone of the central hydrogen jet(s) 13a. The combustion of the hydrogen and its interaction with the swirling flow 12 of the mixture of air and fuel can help improve combustion stability within the combustion space of the combustion chamber 2a when the air-fuel mixture is a lean mixture having an excess of oxygen relative to the fuel within the mixture (e.g. there is more oxygen within the mixture than needed to fully combust the fuel within the flow).

FIG. 14 further illustrates the interaction between the injected hydrogen and the output mixture of fuel and air from the burner 4 in an exemplary interaction process that can result from the operation of the exemplary burner 4 having the outer conduit 5 and the inner hydrogen injection conduit 7. The secondary wake region 11 can include at least one secondary wake 11a adjacent each hydrogen output orifice, which can create one or more small recirculation zones within the secondary wake region 11 in a first step S1 of the exemplary process. Flames, or flame structures 11b, formed in secondary wake region 11 can communicate heat and active chemical species (e.g. radicals) to local hydrogen jet 13 and adjacent secondary wakes 11a in a second step S2 of the exemplary process. The ignited jets 13 can communicate heat and active chemical species to the larger at least one first wake 12*c* formed from the fuel combusting in the combustion chamber 2*a* as it is output from the outlet 5*b* of the outer conduit 5 and passes across the discharge region 14 of the outlet 7*b* of the inner hydrogen injection conduit 7 in a third step S3 of the exemplary process. The hot, activated gases in the first wake(s) 12*c* from combustion of the fuel can communicate heat and active chemical species to the output flow exiting burner 4 in a fourth step S4 of the exemplary process. The interaction between the first wake(s) 12*c* and second wakes 11*a* of the secondary wake region 11 can facilitate improved combustion stability as a consequence of the combustion of hydrogen interacting with combustion gases of the first wake(s) 12*c* in a fifth step S5 of the exemplary process. This interaction can include, for example, activated gas in the one or more first wakes 12*c* from combustion of fuel communicating heat and active chemical species with the one or more second wakes 11*a*.

We believe the improved combustion stability and gas turbine system performance that can be provided by embodiments of my hydrogen injection arrangement 1 is due to a number of factors. For instance, we believe that the kinetic energy of each relatively high velocity hydrogen jet 13 can act as a pump that can entrain local mass in proportion to its velocity while generating local turbulence within the combustion chamber 2*a* that enhances mixing. The enhanced mixing can help reduce temperature stratifications; which can lower peak flame temperatures and thereby reduce $NO_x$ emissions. As another example, we believe that the high velocity hydrogen injection jet(s) 13 can help to convectively transport the heat released during the combustion of the hydrogen so that this heat is transported away from the nozzle, which can prevent nozzle overheating.

Embodiments of the hydrogen injection arrangement 1 that utilize multiple hydrogen jets 13 can provide relatively high nozzle velocity hydrogen jets to create a multiplicity of secondary jet wake flows 11*a* that can each entrain lean premix air-natural gas reactants and hot products of combustion into the hydrogen jet. Due to the low ignition energy of hydrogen, the excess oxygen available in the entrained mass and the elevated temperature of combustion products, the hydrogen—entrained gas mixture is readily ignited within the relatively low velocity secondary wake region 11 within the combustion chamber 2*a*—which can be a region near the outlet of the burner 4 that is located upstream of where the swirling flow 12 of the air-fuel mixture output from the outlet 5*b* of the outer conduit 5 may pass within the combustion chamber as it is injected therein such that this secondary wake region 11 is between the outlet 7*b* of the inner hydrogen injection conduit 7 and the region within the combustion chamber that is axially spaced apart from the outlet within the combustion chamber at which the swirling flow 12 output from the outer conduit's outlet 5*b* will pass.

The multiplicity of secondary wake ignition sources that can be provided by the multiple jets 13 of injected hydrogen (e.g. hydrogen injected via first zone and second zone orifices 21 and 23, etc.) can generate an array of small flame structures within the combustion chamber 2*a* in the secondary wake region 11 that each act as a miniature "pilot" flame to adjacent hydrogen jets 13. We have determined that this can provide a synergistic effect among adjacent hydrogen jets 13 that can unexpectedly provide a much higher level of flame stability as compared to use of a single hydrogen jet 13 of the same mass flow rate as the cumulative sum of flow rates from the multiple hydrogen jets 13.

In some embodiments, the central (axial) injection of hydrogen that can be provided by the at least one central injection jet 13*a* of hydrogen can be output so this central jet can mix with recirculated gases in the wake of the burner 4 at or below an equivalence ratio of unity, which can be an operational mode in which the mixture thus created in the burner wake within the combustion chamber 2*a* remains stoichiometric or lean. Hydrogen injected above the stoichiometric amount can constitute an excess reactant that can become diluted in its effect as it mixes with other gases outside the burner wake. Expressed mathematically, assuming that the ratio of hydrogen to a fuel flow rate is much less than unity, it can be shown that this ratio is equal to:

$$\frac{m, \text{H2, central, max}}{m, \text{Fuel}} \approx 0.5 * \left[\frac{m, recirc}{m, \text{total}}\right] * \left[\frac{1-\Phi}{\Phi}\right]$$

where m,H2,central,max is the maximum allowable central hydrogen injection mass flow rate; m,Fuel is the burner fuel flow rate, m,recirc is the mass flow recirculation (i.e. reverse flow) rate in the burner first wake region; m,total is the total burner flow rate and $\Phi$ is the equivalence ratio accounting for only air and fuel injected through the burner. It should be understood that the recirculation gas flow rate (m,recirc) can be a function of the main premix burner swirl number and average axial injection velocity that may either be estimated by empirical correlation (available in the public domain) or via computational fluid dynamics modeling.

For embodiments in which the fuel is methane (CH4), the m,Fuel variable would be the mass flow rate of methane injected into the combustion chamber 2*a* via the outlet 5*b* of the outer conduit 5. Of course, this fuel flow rate value may be different depending on the type of fuel utilized in the combustion chamber 2*a* as the fuel could alternatively be propane, liquefied petroleum gas, fuel oil, No. 2 fuel oil, kerosene, or a synthetic gas made from another type of fuel (e.g. carbon, etc.) or another type of suitable fuel.

Embodiments of the hydrogen injection arrangement 1 can be configured for utilization in gas turbine systems to provide a co-firing of hydrogen with a primary fuel (e.g. natural gas, propane, liquefied petroleum gas, No. 2 fuel oil, kerosene, synthetic gases made from other fuels, etc.). The hydrogen injection arrangement 1 can be utilized to facilitate different types of operation of the gas turbine system. For instance, the arrangement can be utilized to help lower the overall combustor stoichiometric ratio utilized during operation of the gas turbine system. As another example, the hydrogen injection arrangement 1 can be utilized to help facilitate an increased combustor axial fuel staging.

For instance, the hydrogen injection arrangement 1 can be employed to use the hydrogen for lowering the overall equivalence ratio of the combustor relative to the low equivalence ratio limit attainable without hydrogen injection (based on hydrogen, primary fuel and air flow rates, where the primary fuel can be the fuel included in the mixture of fuel and air output into the combustion chamber via the outer conduit 5). This can occur by the injected hydrogen offsetting the ratio of fuel to available oxygen to provide for an increased proportion of oxygen so that a lower equivalence ratio for the combustion occurring within the combustion space of the combustor chamber 2*a*. An objective of such an operational strategy for a gas turbine system can be to either facilitate extended turbine load reduction and/or to lower combustor $NO_x$ emissions without increasing carbon monoxide (CO) emissions. It can be shown that the relationship among the reactant flow rates for this operational case is equal to:

$$m\text{H2, total} < \left(\frac{\beta prim}{\beta H2}\right) * Mair * \left(\frac{MH2}{Mprim}\right) * (PFR0 - PFR1)$$

where:
mH2,total is the total hydrogen injection rate;
βprim is the molar, air-fuel stoichiometric coefficient for the primary fuel (Note: for methane as the primary fuel, βprim can be equal to 9.52);
βH2, is the molar, air-fuel stoichiometric coefficient for hydrogen, which is equal to 2.38;
Mair is the molecular weight of air;
MH2 is the molecular weight of hydrogen;
Mprim is the molecular weight of the primary fuel;
PFR0 is the primary fuel to air mass flow ratio prior to hydrogen injection; and
PFR1 is the primary fuel to air mass flow ratio during hydrogen injection.

The injection of hydrogen can be controlled so that the operation of one or more of the combustors of the gas turbine system (or all of the combustors of the gas turbine system) is constrained by the above relationship to control operations of the gas turbine system and/or the combustor (s):

Hydrogen injection can also (or alternatively) be employed via an exemplary embodiment of the hydrogen injection arrangement 1 to facilitate a larger magnitude staging of fuel or air for NOx reduction purposes in a gas turbine combustor of a gas turbine system. For example, with fuel-staged combustion, fuel can be diverted away from the outlet of the burner 4 and introduced at a downstream location of the combustor. FIG. 5, may best illustrate such a configuration as at least one control valve 30 of a fuel feed system for the combustor can be configured to permit a portion of the fuel feed to flow to the outer conduit 5 for pre-mixing with air for being output from the outlet 5b of the outer conduit while another portion of the fuel can be routed for being fed into the combustor chamber 2a downstream of the burner 4. In such situations, the main burner 4 of the combustor can run with a lower equivalence ratio than would be employed without fuel staging. The degree of fuel staging is in many cases limited by lean combustion stability limits of the main burner 4. By utilization of hydrogen injection via an embodiment of my hydrogen injection arrangement 1, the burner's lean combustion safe operating limit can be extended, which can drive a greater NOx reduction by increasing the proportion of axially-staged fuel.

It should be appreciated that modifications to the embodiments explicitly shown and discussed herein can be made to meet a particular set of design objectives or a particular set of design criteria. For example, embodiments of the hydrogen injection arrangement 1 can utilize a single output orifice or multiple output orifices for injecting one or more jets of hydrogen gas into the combustion chamber at a pre-selected flow rate or a flow rate within a pre-selected hydrogen injection flow rate range. In some embodiments, such a range may be less than 100 m/s or less than 300 m/s. In yet other embodiments such a range can be higher than 100 m/s or higher than 300 m/s.

As another example, the size and shape of the inner hydrogen injection conduit 7 and outer conduit 5 can be any type of suitable size and shape to meet a particular set of design criteria for the operational performance of a particular gas turbine system. For instance, some embodiments may be quite large while others can be smaller to account for the size of the combustor in which it is to be utilized and the operational requirements for that combustor.

As yet another example, embodiments of the hydrogen injection arrangement 1 can be configured to inject one or more jets 13 of hydrogen that is 100% hydrogen gas or that has another composition (e.g. more than 80% hydrogen gas by volume and less than 20% other gases by volume, etc.). Other gas elements that can be included in the hydrogen gas jets 13 can include nitrogen or carbon dioxide, for example. It should be appreciated that the injected hydrogen jet(s) 13 can include a composition of hydrogen that is at least 99% by volume hydrogen, at least 95% by volume hydrogen, at least 90% by volume hydrogen, at least 75% by volume hydrogen, or at least 50% by volume hydrogen. The particular composition of the hydrogen jet flow rate utilized in a particular embodiment of the hydrogen injection arrangement may depend on the source of the hydrogen being injected and other operational or design criteria for the gas turbine system.

The gas turbine system as well as the hydrogen injection arrangement 1 that can be incorporated into the system can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the system, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a hydrogen injection arrangement, an apparatus for hydrogen injection within a combustor, a combustor for a gas turbine system, a gas turbine system, and methods of making and using the same have been shown and described above, it is to be distinctly understood that the invention is not limited thereto but may be otherwise variously embodied and practiced within the scope of the following claims.

The invention claimed is:

1. A hydrogen injection arrangement for injecting hydrogen into a combustion chamber of a combustor of a gas turbine system, the hydrogen injection arrangement comprising:
an outer conduit having an outlet in fluid communication with the combustion chamber, the outer conduit configured so that a mixture of fuel and air is passable into the combustion chamber via the outlet of the outer conduit, and
an inner hydrogen injection conduit positioned adjacent to the outer conduit, the outer conduit being positioned such that the outlet of the outer conduit is around an outer periphery of an outlet of the inner hydrogen injection conduit that is in fluid communication with the combustion chamber, the inner hydrogen injection conduit configured such that at least one jet of hydrogen is injectable into the combustion chamber via the outlet of the inner hydrogen injection conduit;

wherein the outlet of the inner hydrogen injection conduit is positioned to output the at least one jet of hydrogen toward a first wake region within the combustion chamber that is downstream of the outlet of the inner hydrogen injection conduit and upstream of a position within the combustion chamber at which the mixture of fuel and air output from the outlet of the outer conduit crosses a discharge region of the outlet of the inner hydrogen injection conduit, wherein the inner hydrogen injection conduit is positioned and configured such that a secondary wake region is formed by the at least one jet of hydrogen adjacent the first wake region or as it enters the first wake region.

2. A hydrogen injection arrangement for injecting hydrogen into a combustion chamber of an operating combustor of a gas turbine system, the hydrogen injection arrangement comprising:
an outer conduit having an outlet in fluid communication with the combustion chamber, the outer conduit configured so that a mixture of fuel and air is passable into the combustion chamber via the outlet of the outer conduit, and
an inner hydrogen injection conduit positioned adjacent to the outer conduit, the outer conduit being positioned such that the outlet of the outer conduit is around an outer periphery of an outlet of the inner hydrogen injection conduit that is in fluid communication with the combustion chamber, the inner hydrogen injection conduit configured such that at least one jet of hydrogen is injectable into the combustion chamber via the outlet of the inner hydrogen injection conduit;
wherein the outlet of the inner hydrogen injection conduit is positioned to output the at least one jet of hydrogen toward a first wake region within the combustion chamber that is downstream of the outlet of the inner hydrogen injection conduit and upstream of a position within the combustion chamber at which the mixture of fuel and air output from the outlet of the outer conduit crosses a discharge region of the outlet of the inner hydrogen injection conduit, wherein the inner hydrogen injection conduit is positioned and configured such that a secondary wake region is formed by the at least one jet of hydrogen adjacent the first wake region or as it enters the first wake region.

3. The hydrogen injection arrangement of claim 2, wherein outer conduit has at least one swirler to generate a swirling flow for the mixture of air and fuel to be output from the outlet of the outer conduit; and
the secondary wake region is between the outlet of the inner hydrogen injection conduit and the position within the combustion chamber at which the mixture of fuel and air output from the outlet of the outer conduit crosses the outlet of the inner hydrogen injection conduit while the fuel of the mixture combusts in the combustion chamber.

4. The hydrogen injection arrangement of claim 2, wherein the outlet of the inner hydrogen injection conduit is a single orifice and the inner hydrogen injection conduit has at least one cavity upstream of the single orifice.

5. The hydrogen injection arrangement of claim 4, wherein the at least one cavity has a depth, a cavity length, and a cavity trailing edge distance, which is a distance a downstream end of the cavity is from the outlet of the inner hydrogen injection conduit;
the cavity depth being greater than or equal to a radius of the orifice of the outlet of the inner hydrogen injection conduit and also be less than or equal to a diameter of the orifice of the outlet of the inner hydrogen injection conduit;
the cavity length being a value so that a ratio of the length to the depth is between 1 and 4;
the cavity trailing edge distance being a value so that a ratio of the cavity trailing edge distance to the diameter is no more than 5.

6. The hydrogen injection arrangement of claim 2, wherein the outlet of the inner hydrogen injection conduit includes a nozzle with at least one central orifice to form at least one central jet of hydrogen to inject hydrogen into the combustion chamber and multiple outer orifices to form multiple non-central jets of hydrogen to inject hydrogen into the combustion chamber.

7. The hydrogen injection arrangement of claim 6, wherein the outer orifices are configured so that each of the non-central jets of hydrogen is output in a flow direction that flows at an angle to a flow direction of the at least one central jet of hydrogen, the angle being greater than 0° and less than 90° or greater than 15° and less than 60°.

8. The hydrogen injection arrangement of claim 6, wherein the at least one central orifice is configured to form the at least one central jet of hydrogen so the at least one central jet of hydrogen has a velocity of at least 100 m/s and the outer orifices are configured to form the non-central jets of hydrogen to have velocities that are at least 100 m/s.

9. The hydrogen injection arrangement of claim 2, wherein the outlet of the inner hydrogen injection conduit is a single orifice configured to inject the hydrogen as a jet of hydrogen that has a velocity of at least 100 m/s.

10. A method of injecting hydrogen into a combustion chamber of a combustor of a gas turbine system, the method comprising:
outputting a mixture of fuel and air into the combustion chamber via an outlet of an outer conduit in fluid communication with the combustion chamber;
injecting at least one jet of hydrogen into the combustion chamber via an outlet of an inner hydrogen injection conduit that is in fluid communication with the combustion chamber, and
the outer conduit being positioned such that the outlet of the outer conduit is around an outer periphery of the outlet of the inner hydrogen injection conduit;
wherein the at least one jet of hydrogen is injected toward a first wake region within the combustion chamber that is downstream of the outlet of the inner hydrogen injection conduit and upstream of a position within the combustion chamber at which the mixture of fuel and air output from the outlet of the outer conduit crosses a discharge region of the outlet of the inner hydrogen injection conduit within the combustion chamber.

11. The method of claim 10, wherein a secondary wake region is formed by injecting the at least one jet of hydrogen toward the first wake region.

12. The method of claim 11, comprising:
generating a swirl of air via at least one swirler to generate a swirling flow for the mixture of air and fuel prior to outputting the mixture of air and fuel from the outlet of the outer conduit; and
wherein the secondary wake region is between the outlet of the inner hydrogen injection conduit and the position within the combustion chamber at which the mixture of fuel and air output from the outlet of the outer conduit crosses the outlet of the inner hydrogen injection conduit while the fuel of the mixture combusts in the combustion chamber.

13. The method of claim 10, wherein the outlet of the inner hydrogen injection conduit is a single orifice and the inner hydrogen injection conduit has at least one cavity upstream of the single orifice.

14. The method of claim 13, wherein the at least one cavity has a depth, a cavity length, and a cavity trailing edge distance, which is a distance a downstream end of the cavity is from the outlet of the inner hydrogen injection conduit;
the cavity depth being greater than or equal to a radius of the orifice of the outlet of the inner hydrogen injection conduit and also be less than or equal to a diameter of the orifice of the outlet of the inner hydrogen injection conduit;
the cavity length being a value so that a ratio of the length to the depth is between 1 and 4;
the cavity trailing edge distance being a value so that a ratio of the cavity trailing edge distance to the diameter is no more than 5.

15. The method of claim 10, wherein the at least one jet of hydrogen is at least one central jet of hydrogen and the outlet of the inner hydrogen injection conduit includes a nozzle with at least one central orifice to form the at least one central jet of hydrogen to inject hydrogen into the combustion chamber and multiple outer orifices to form multiple non-central jets of hydrogen to inject hydrogen into the combustion chamber, the method also comprising: injecting the non-central jets of hydrogen into the combustion chamber via the outer orifices of the nozzle.

16. The method of claim 15, wherein the outer orifices are configured so that each of the non-central jets of hydrogen are output in a flow direction that flows at an angle to a flow direction of the at least one central jet of hydrogen, the angle being greater than 0° and less than 90° or greater than 15° and less than 60°.

17. The method of claim 15, wherein the at least one central jet of hydrogen has a velocity of at least 100 m/s and each of the non-central jets of hydrogen have a velocity that is at least 100 m/s.

18. The method of claim 10, wherein the at least one jet of hydrogen has a velocity of at least 100 m/s.

19. The method of claim 10, comprising:
generating a swirl of air via at least one swirler to generate a swirling flow for the mixture of air and fuel prior to outputting the mixture of air and fuel from the outlet of the outer conduit; and
passing the swirling flow within the combustion chamber to a position at which the mixture of fuel and air within the swirling flow crosses a discharge region of the outlet of the inner hydrogen injection conduit within the combustion chamber;
wherein the at least one jet of hydrogen is injected into a secondary wake region within the combustion chamber that is downstream of the outlet of the inner hydrogen injection conduit and upstream of the position within the combustion chamber at which the mixture of fuel and air within the swirling flow crosses the discharge region of the outlet of the inner hydrogen injection conduit; and
wherein the secondary wake region is between the outlet of the inner hydrogen injection conduit and the position within the combustion chamber at which the mixture of fuel and air within the swirling flow crosses the discharge region of the outlet of the inner hydrogen injection conduit, the secondary wake region having at least one second wake that interacts with at least one first wake within a first wake region generated by the swirling flow of the mixture of air and fuel as the fuel combusts inside the combustion chamber.

20. The method of claim 19, wherein activated gas from combustion of fuel in the at least one first wake communicates heat and active chemical species with the at least one second wake.

* * * * *

UNITED STATES PATENT AND TRADEMARK OFFICE
CERTIFICATE OF CORRECTION

PATENT NO. : 12,085,282 B2
APPLICATION NO. : 18/229319
DATED : September 10, 2024
INVENTOR(S) : Mark Daniel D'Agostini and Anup Vasant Sane It is certified that error appears in the above-identified patent and that said Letters Patent is hereby corrected as shown below:

In the Specification

Column 8, Line 33:
Replace "Mair is the molecular weight of air;" with "Mair is the mass flow rate of air;"

Column 19, Line 17:
Replace "Mair is the molecular weight of air;" with "Mair is the mass flow rate of air;"

Signed and Sealed this
Tenth Day of December, 2024

Katherine Kelly Vidal
*Director of the United States Patent and Trademark Office*